(12) United States Patent
Ishikawa et al.

(10) Patent No.: US 12,384,032 B2
(45) Date of Patent: Aug. 12, 2025

(54) ROUTE GENERATION DEVICE, ROUTE GENERATION METHOD, AND NON-TRANSITORY COMPUTER READABLE STORAGE MEDIUM

(71) Applicant: DENSO CORPORATION, Kariya (JP)

(72) Inventors: Shota Ishikawa, Kariya (JP); Tomoaki Ozaki, Kariya (JP); Toshitaka Suzuki, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 212 days.

(21) Appl. No.: 18/047,566

(22) Filed: Oct. 18, 2022

(65) Prior Publication Data

US 2023/0125294 A1    Apr. 27, 2023

(30) Foreign Application Priority Data

Oct. 21, 2021   (JP) .................. 2021-172581

(51) Int. Cl.
*B25J 9/16*   (2006.01)

(52) U.S. Cl.
CPC .......... *B25J 9/1664* (2013.01); *B25J 9/1674* (2013.01); *B25J 9/1666* (2013.01)

(58) Field of Classification Search
CPC ...... B25J 9/1664; B25J 9/1674; B25J 9/1666; G05B 2219/40317
See application file for complete search history.

(56) References Cited

U.S. PATENT DOCUMENTS

| | | | |
|---|---|---|---|
| 2005/0004709 A1 | 1/2005 | Watanabe et al. | |
| 2016/0332297 A1* | 11/2016 | Sugaya | B25J 9/1671 |
| 2018/0036882 A1* | 2/2018 | Kimura | B25J 9/1664 |
| 2019/0039242 A1 | 2/2019 | Fujii et al. | |
| 2019/0221037 A1 | 7/2019 | Sugaya | |
| 2019/0240833 A1* | 8/2019 | Kimura | B25J 9/1664 |
| 2019/0275675 A1* | 9/2019 | Seno | G05B 19/02 |
| 2021/0035363 A1 | 2/2021 | Sugaya | |
| 2021/0252707 A1* | 8/2021 | Wang | B25J 9/1666 |
| 2022/0016784 A1* | 1/2022 | Tawara | B25J 9/1697 |
| 2022/0035375 A1* | 2/2022 | Rezaee | G06N 3/08 |
| 2022/0314437 A1* | 10/2022 | Gienger | B25J 9/1671 |
| 2022/0402135 A1* | 12/2022 | Bremer | B25J 9/1674 |
| 2023/0211500 A1* | 7/2023 | Satou | B25J 9/1656 |
| | | | 700/193 |
| 2023/0267690 A1 | 8/2023 | Sugaya | |

(Continued)

FOREIGN PATENT DOCUMENTS

| | | |
|---|---|---|
| JP | H10-128684 A | 5/1998 |
| JP | 2015-98076 A | 5/2015 |

*Primary Examiner* — Sohana Tanju Khayer
(74) *Attorney, Agent, or Firm* — Maschoff Brennan

(57) ABSTRACT

A route is generated for a robot with multiple parts connected rotatably. Multiple waypoints indicating a posture of the robot are registered. It is determined whether a registration waypoint is allowable as the posture of the robot. The route is generated to connect an added waypoint and an existing waypoint. It is determined whether the route satisfies the condition that the robot is operable. The adding of the waypoint and the generating of the route are repeated until the route reaches the end point. Determination results of the registration waypoint and the generated route and the condition determined not to be satisfied are displayed.

16 Claims, 13 Drawing Sheets

(56) References Cited

U.S. PATENT DOCUMENTS

| | | | |
|---|---|---|---|
| 2023/0294292 A1* | 9/2023 | Ono .................... | B25J 9/1666 |
| | | | 700/259 |
| 2023/0339111 A1* | 10/2023 | Hamaya ................ | B25J 9/1664 |
| 2024/0139962 A1* | 5/2024 | Kittaka ................ | B25J 9/1679 |

* cited by examiner

FIG. 16

|    | ROBOT ARR         | REG WAYP |          |          |          |      |
|----|-------------------|----------|----------|----------|----------|------|
|    |                   | 0        | 1        | 2        | 3        |      |
| 46 | -100,200,-200,0,... | IKFailed | IKFailed | IKFailed | IKFailed | IKSu |
| 47 | -100,200,-100,0,... | IKFailed | IKFailed | IKFailed | IKFailed | IKSu |
| 48 | -100,200,0,0,0,0  | Enable   | IKFailed | IKFailed | IKFailed | IKSu |
| 49 | -100,200,100,0,0,0 | Enable  | IKFailed | IKFailed | IKFailed | IKSu |
| 50 | -100,200,200,0,0,0 | Enable  | IKFailed | IKFailed | IKFailed | IKSu |
| 51 | 0,-200,-200,0,0,0 | IKFailed | IKFailed | IKFailed | IKFailed | Colli |
| 52 | 0,-200,-100,0,0,0 | CollisionPoint | IKFailed | IKFailed | IKFailed | Colli |
| 53 | 0,-200,0,0,0,0    | Enable   | IKFailed | IKFailed | IKFailed | IKSu |
| 54 | 0,-200,100,0,0,0  | Enable   | IKFailed | IKFailed | IKFailed | IKSu |
| 55 | 0,-200,200,0,0,0  | Enable   | IKSuccess | IKSuccess | IKSuccess | IKSu |
| 56 | 0,-100,-200,0,0,0 | IKFailed | IKFailed | IKFailed | IKFailed | Colli |
| 57 | 0,-100,-100,0,0,0 | CollisionPoint | IKFailed | IKFailed | IKFailed | Colli |
| 58 | 0,-100,0,0,0,0    | Enable   | IKFailed | IKFailed | IKFailed | IKSu |
| 59 | 0,-100,100,0,0,0  | Enable   | Enable   | Enable   | Enable   | Enat |
| 60 | 0,-100,200,0,0,0  | Enable   | Enable   | Enable   | Enable   | Enat |
| 61 | 0,0,-200,0,0,0    | IKFailed | IKFailed | IKFailed | IKFailed | IKSu |

ROUTE GENERATION DEVICE, ROUTE GENERATION METHOD, AND NON-TRANSITORY COMPUTER READABLE STORAGE MEDIUM

CROSS REFERENCE TO RELATED APPLICATION

The present application claims the benefit of priority from Japanese Patent Application No. 2021-172581 filed on Oct. 21, 2021. The entire disclosure of the above application is incorporated herein by reference.

TECHNICAL FIELD

It relates to a technique for generating a path of a robot having a plurality of parts connected so as to be relatively rotatable.

BACKGROUND

A conceivable technique teaches a technique for calculating an evaluation value for each arrangement of a robot or an apparatus by using an avoidance interference trajectory generated by a route search algorithm such as RRT (Rapidly-exploring Random Trees). By doing so, it is possible to adopt the arrangement of robots and devices having good evaluation values.

SUMMARY

According to an example, a route is generated for a robot with multiple parts connected rotatably. Multiple waypoints indicating a posture of the robot are registered. It is determined whether a registration waypoint is allowable as the posture of the robot. The route is generated to connect an added waypoint and an existing waypoint. It is determined whether the route satisfies the condition that the robot is operable. The adding of the waypoint and the generating of the route are repeated until the route reaches the end point. Determination results of the registration waypoint and the generated route and the condition determined not to be satisfied are displayed.

BRIEF DESCRIPTION OF THE DRAWINGS

The above and other objects, features and advantages of the present disclosure will become more apparent from the following detailed description made with reference to the accompanying drawings. In the drawings.

FIG. 16 is a diagram showing a determination result for each waypoint when the arrangement of the robot is changed;

DETAILED DESCRIPTION

Figure 1:
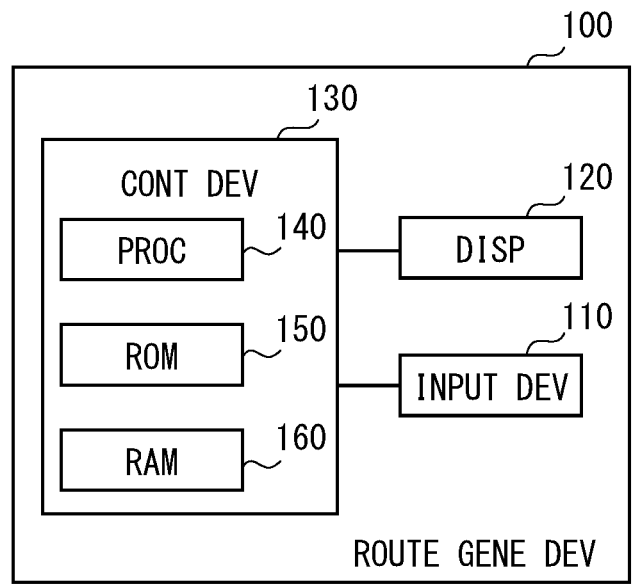
FIG. 1 is a diagram showing a configuration of a route generation device 100 according to a first embodiment.

The interference avoidance trajectory is a route in which the robot functions while avoiding the interference from the start point to the end point. Hereinafter, the interference avoidance trajectory is described as a route. Even if a route is searched using a device for searching a route, no route may be generated. A conceivable technique does not teach what to do when no route can be generated.

There are various reasons why a route cannot be generated, such as the waypoints interfering with the equipment, a path between the waypoints interfering with the equipment, no solution for inverse kinematics at the waypoints, and singular point errors during CP (Continuous Path) operation. If the route cannot be generated, the user changes the equipment layout and the waypoint of the robot, and then executes the route generation process again.

As mentioned above, there are various reasons why a route cannot be generated. In addition, knowledge of the robot mechanism and experience in equipment design are required to identify the cause. Therefore, the user does not know what kind of measures should be taken, and often repeats trial and error. As a result, route generation is a time-consuming task.

The present embodiments has been made based on this circumstance, and the purpose of the present disclosure is to provide a route generation device, a route generation method, and a route generation program that make it easy to identify the cause of the route generation failure when the route cannot be generated.

One disclosure relating to a route generation device for achieving the above objectives is: a route generation device that generates a route for a robot with multiple parts that are connected so as to be relatively rotatable.

The route generation device includes:
a waypoint registration unit for registering a plurality of waypoints including a start point and an end point, which means one posture of the robot;
a waypoint condition determination unit for determining whether or not the registered waypoint, which is the waypoint registered by the waypoint registration unit, is allowable as the posture of the robot, based on a predetermined condition;
a route generation unit that generates a route connecting the added waypoint and the existing waypoint while adding the waypoint; and
a route condition determination unit that determines whether the route generated by the route generation unit satisfies the condition for enabling the robot to operate.

When the processing continuation condition is satisfied, the route generation unit and the route condition determination unit repeat the processing until the route reaches the end point.

The route generation device further includes: a determination result display processing unit that displays the determination results determined by the waypoint condition determination unit and the route condition determination unit and the condition determined that the condition is not satisfied in the determination on the display device.

This route generation device includes a determination result display processing unit, and displays the condition determined not to satisfy the condition on the display device. Therefore, the user who uses the route generation device can easily identify the reason why the route cannot be generated by checking the condition displayed on the display device and determined that the condition is not satisfied.

The route generation method for achieving the above objectives is a route generation method that generates a route for a robot with multiple parts that are connected so as to be relatively rotatable.

The route generation method includes:
registering a plurality of waypoints that indicate one posture of the robot, and include the start point and end point;
determining whether or not the registered waypoint, which is registered as the waypoint, is allowable as the posture of the robot based on the predetermined condition;
generating a route connecting the added waypoint and the existing waypoint while adding the waypoint;
determining whether the generated route satisfies the condition for enabling the robot to operate;
repeating the adding of the waypoint and the generating of the route until the routes reaches the end point when the processing continuation condition is satisfied; and
displaying the determination result of the registered waypoint, the determination result of the generated route, and the condition determined that the condition is not satisfied in the determination on the display device.

The route generation program for achieving the above objectives is a route generation program that is executed by a processor and generates a route for a robot with multiple parts that are connected so as to be relatively rotatable.

The processor executes:
registering a plurality of waypoints that indicate one posture of the robot, and include the start point and end point;
determining whether or not the registered waypoint, which is registered as the waypoint, is allowable as the posture of the robot based on the predetermined condition;
generating a route connecting the added waypoint and the existing waypoint while adding the waypoint;
determining whether the generated route satisfies the condition for enabling the robot to operate;
repeating the adding of the waypoint and the generating of the route until the routes reaches the end point when the processing continuation condition is satisfied; and
displaying the determination result of the registered waypoint, the determination result of the generated route, and the condition determined that the condition is not satisfied in the determination on the display device.

First Embodiment

The following will describe an embodiment of the present disclosure with reference to the drawings. FIG. 1 is a diagram showing a configuration of a route generation device 100 according to a first embodiment. The route generation device 100 is, for example, a device that generates a motion route for a robot 10 shown in FIG. 2. The motion route means a time change of a posture of the robot 10. The route is indicated by a set of waypoints from the start point to the end point. Each waypoint is a set of parameters that specify the posture of the robot. The posture of the robot 10 is also specified at the start point and the end point. The start point and end point are also included in the waypoints.

Figure 2:
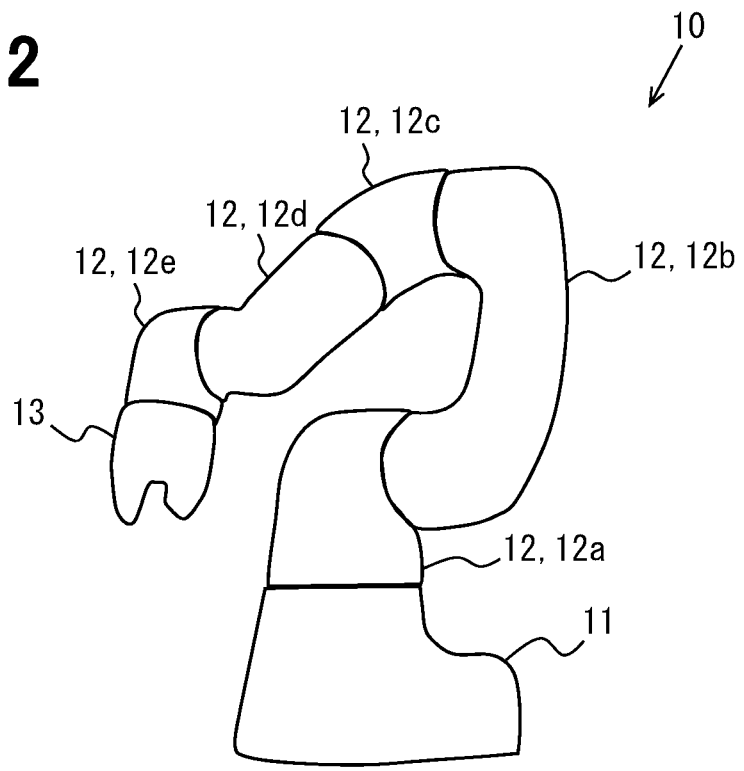
FIG. 2 is a diagram showing a configuration of a robot.

The robot 10 shown in FIG. 2 has a configuration including a base 11, five arms 12, and one hand 13. The base 11 is installed on a workbench or the like. The five arms 12 are a first arm 12a, a second arm 12b, a third arm 12c, a fourth arm 12d, and a fifth arm 12e. When these are not distinguished, it is described as arm 12.

The base 11 and the first arm 12a are configured to be relatively rotatable by a built-in motor. Similarly, the second arm 12b and the third arm 12c, the third arm 12c and the fourth arm 12d, the fourth arm 12d and the fifth arm 12e, the fifth arm 12e and the hand 13 are also configured to be relatively rotatable. The robot 10 configured in this way has a configuration including six rotation axes. With the six rotation axes, the seven parts, that is, the base 11, the five arms 12, and the hand 13 rotate relative to the parts connected by the rotation axes. Since it has six rotation axes, the posture of the robot 10, that is, the waypoint is defined by the rotation angles of the six axes. The axis of rotation is sometimes called a joint. The number of rotation axes may be one or more, and may not be limited to six.

The description is returned to FIG. 1. The route generation device 100 includes an input device 110, a display device 120, and a control device 130. The control device 130 includes a processor 140, a ROM 150, and a RAM 160. The route generation device 100 having such a configuration can also be realized by a general-purpose computer.

The input device 110 is a keyboard or the like, and is used for inputting the structure, waypoints, and other simulation conditions of the robot 10. The display device 120 is capable of displaying the route generated by the control device 130. Further, when the route is not generated, the display device 120 also displays the determination result regarding the waypoint.

The ROM 150, which is a non-volatile storage medium, stores a route generation program executed by the processor 140. The processor 140 provides each unit shown in FIG. 3 by executing the route generation program stored in the ROM 150 while using the temporary storage function of the RAM 160. The feature that the processor 140 provides each unit shown in FIG. 3 means that the motion route generation method corresponding to the motion route generation program is executed.

Figure 3:
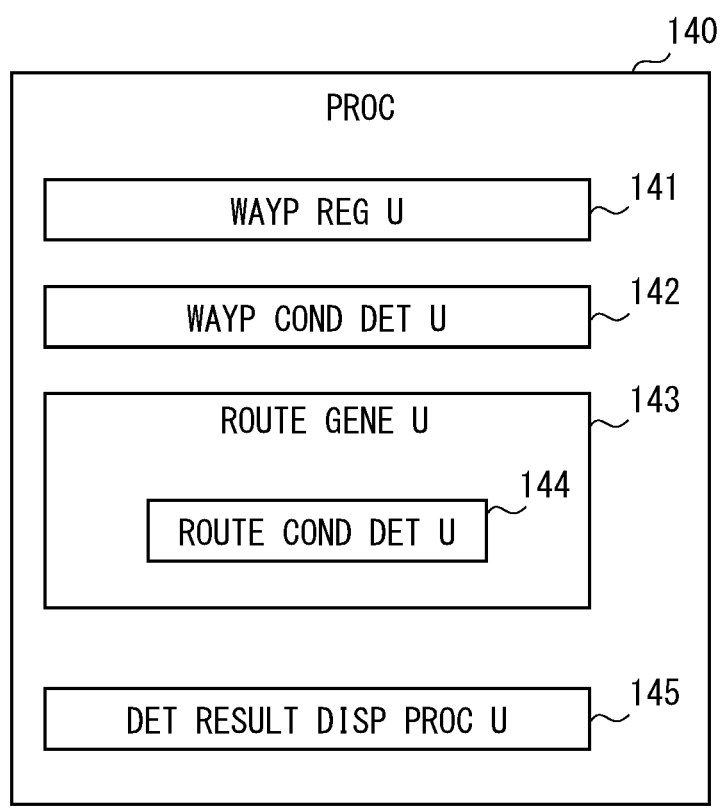
FIG. 3 is a block diagram showing a function included in the processor.
Figure 4:
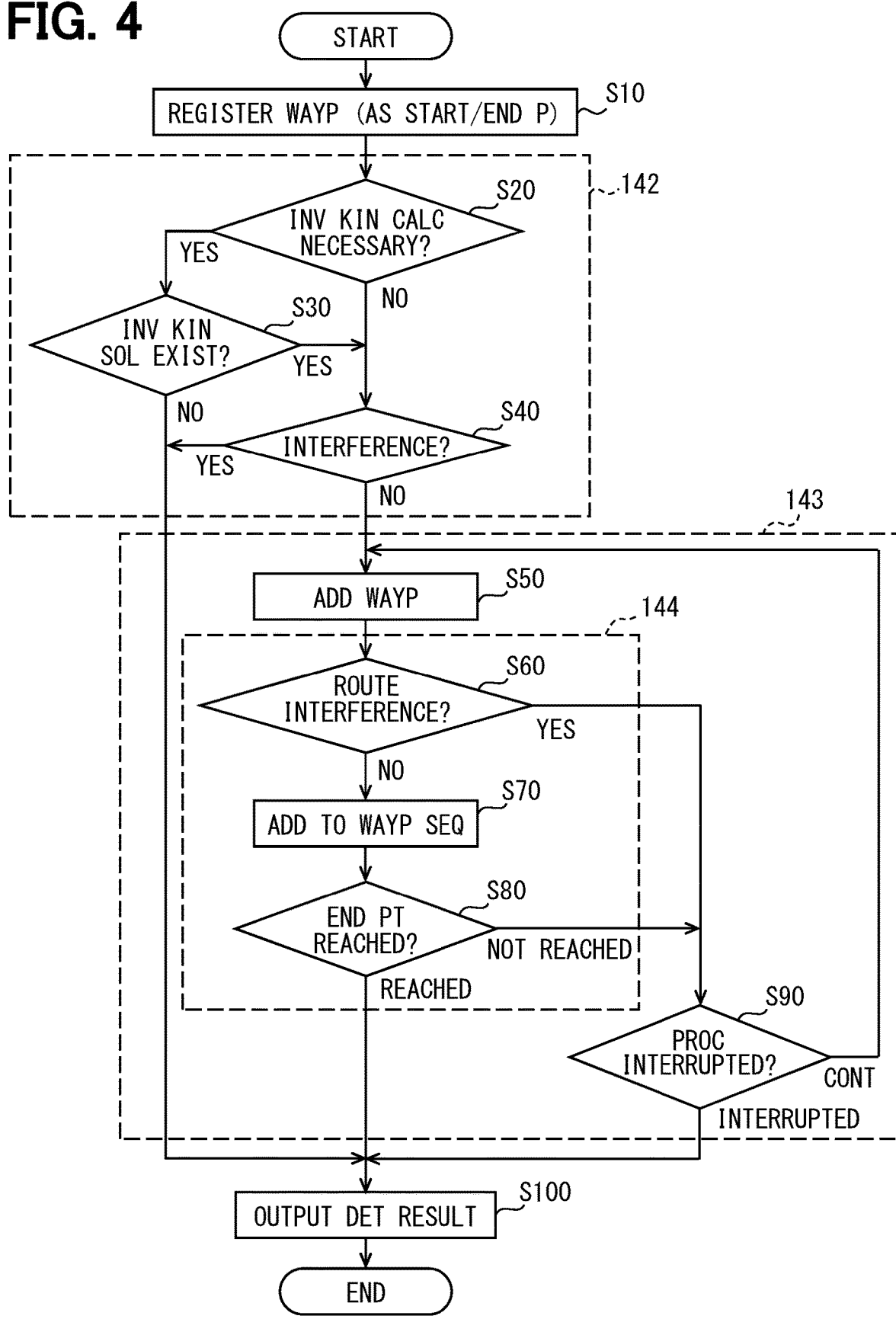
FIG. 4 is a diagram showing a process executed by a processor when the robot operates in PTP.
Figure 5:
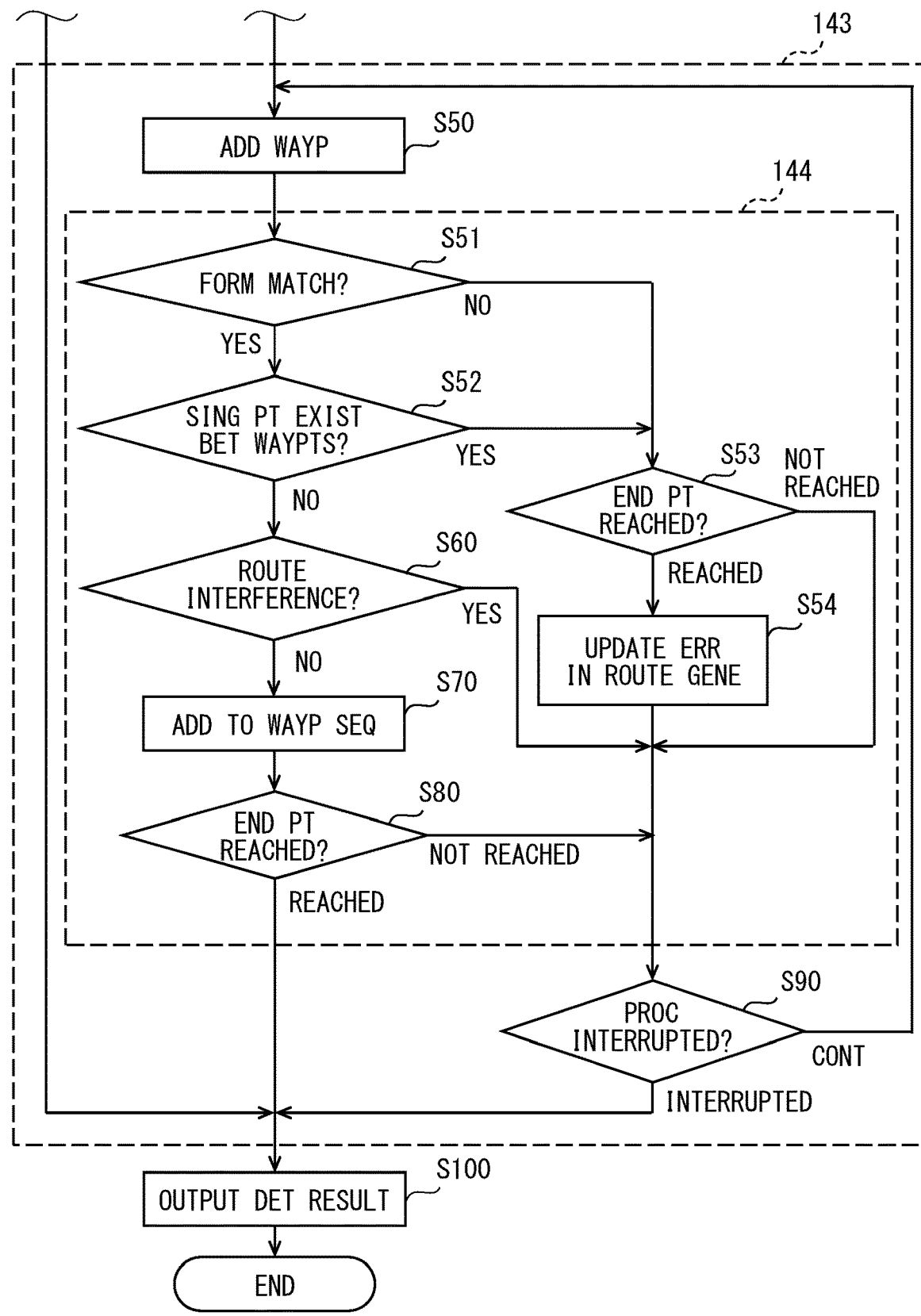
FIG. 5 is a diagram showing a process executed by the processor when the robot operates in CP.

As shown in FIG. 3, the processor 140 includes a waypoint registration unit 141, a waypoint condition determination unit 142, a route generation unit 143, a route condition determination unit 144, and a determination result display processing unit 145. The process executed by these units will be described with reference to the flowchart shown in FIGS. 4 and 5. FIG. 4 shows a process executed when the robot 10 performs a PTP (Point to Point) operation, and FIG. 5 shows a process executed when the robot 10 performs a CP operation. The CP operation is an operation of linearly interpolating the position and posture of the hand 13 in the work space when the robot 10 moves between the waypoints. On the other hand, the PTP operation is an operation of linearly interpolating the joint angle in the joint space.

The flowchart shown in FIG. 4 is started by a start operation of a person who uses the route generation device 100. The route generation device 100 searches for a route by executing the flowchart shown in FIG. 4. Before executing the flowchart in FIG. 4, information necessary for route calculation other than the information input in S10, such as information for specifying the structure of the robot 10 and information for specifying the range where obstacles exist, is stored in a memory included in the route generation device 100.

Step S10 (step is omitted in the following description) is a process executed by the waypoint registration unit 141. In S10, the user registers a waypoint including at least a start point and an end point. Hereinafter, the waypoint registered by the user is referred to as a registration waypoint. The information for registering the registration waypoint is the rotation angle of all the rotation axes included in the robot 10, or the tip position and posture of the hand 13. The waypoints are determined by the rotation angles of all the rotation axes of the robot 10. Here, it may be difficult for the user to input the rotation angles of all the axes of rotation. On the other hand, when the tip position and the posture of the hand 13 are determined, the posture of the robot 10, that is, the waypoint may be specified by inverse kinematics. Therefore, in S10, the waypoint can be registered even by using the tip position and the posture of the hand 13.

Further, in S10, in addition to the registration waypoints, the control method between the registration waypoints may be registered, and the condition for route generation may be registered. The control method between registration waypoints includes an interpolation method between registration waypoints. The interpolation method is the PTP operation or CP operation described above. In addition, the interpolation method between registration waypoints may include a movement speed control execution, a high-accuracy path control execution, and the like. The high-accuracy path control is a control that makes the trajectory accuracy of the tip of the hand 13 higher than that of the normal control. The condition for route generation includes a time-out time, that is, a time for completing the route search, a distance to be secured with an obstacle, and the like.

The waypoint condition determination unit 142 executes S20, S30, and S40. By executing S20, S30, and S40, the waypoint condition determination unit 142 determines whether the registration waypoint is allowable as the posture of the robot. In S20, it is determined whether or not an inverse kinematics calculation is necessary. In S10, when the position of the tip of the hand 13 is registered, the determination result of S20 becomes "YES". When the determination result of S20 is "YES", the process proceeds to S30.

In S30, it is determined whether or not the position of the hand 13 registered in S10 can be solved by an inverse kinematics calculation. When there is an inverse kinematics solution for all registration waypoints, the process proceeds to S40, and when there is no inverse kinematics solution, the process proceeds to S100.

S40 is executed when it is determined in S30 that there is an inverse kinematics solution for all the registration waypoints, or when the determination result in S20 is "NO". In S40, it is determined whether or not the posture of the robot 10 indicated by each registration waypoint interferes with the obstacle. The feature whether or not the robot 10 is interfering with an obstacle is determined by determining whether or not the three-dimensional model of the robot 10 and the three-dimensional model of the obstacle are interfering with each other. When the distance between the robot 10 and the obstacle is equal to or less than a predetermined threshold value (for example, several millimeters), it may be determined as an interference. A convex hull model may be used instead of the three-dimensional model of the robot 10. Further, the distance between the robot 10 and the obstacle may be calculated by expanding one of the three-dimensional model of the robot 10 and the three-dimensional model of the obstacle to determine the interference. When all the registration waypoints are not interfering with the obstacle, the process proceeds to S50. When one or more registration waypoints interfere with the obstacle, the process proceeds to S100.

S50 and S90 are processes executed by the route generation unit 143. In S50, a waypoint is added. The waypoints can be added by a method of randomly generating waypoints such as RRT (Rapidly exploring random tree). In the RRT, the sampling is randomly performed in the 6-axis space formed in 6 rotation axis coordinates, and a new waypoint is added at the position closest to this sampling point, which is extended by a certain distance from the existing waypoint toward the sampling point. Here, similar to the registration waypoints, the waypoint to be added does not interfere with the obstacle. If the addition waypoint interferes with an obstacle, the sampling is repeated again. When the distance between the latest waypoint and the registration waypoint is shorter than the specified value, the waypoint added in S50 is set as the registration waypoint.

Further, in S50, the newly added waypoint and the route connecting the newly added waypoint and the existing waypoint are calculated. The existing waypoint is a waypoint that extends a certain distance toward the sampling point. In FIG. 4, the route is calculated assuming that the robot 10 operates the PTP between the waypoints.

S60, S70, and S80 are processes executed by the route condition determination unit 144. By executing S60, S70, and S80, the route condition determination unit 144 determines whether the route satisfies the condition that the robot 10 can be operated.

In S60, it is determined whether or not there is interference in the route calculated in S50. In S60, in addition to the interference between the robot 10 and the obstacle, the presence or absence of self-interference is also determined. The self-interference means that a part of the robot 10 interferes with another part of the robot 10.

If it is determined that there is interference in the route calculated in S50, the process proceeds to S90. On the other hand, if it is determined that there is no interference, the process proceeds to S70. In S70, the waypoints added in S50 are added to the waypoint sequence. The waypoint sequence is a set of the registration waypoints registered in S10 and the waypoints sequentially added in S70. After execution in S70, the process shifts to S80. In S80, it is determined whether or not the end point has been reached. If the end point has not been reached, the process proceeds to S90, and if the end point is reached, the process proceeds to S100.

In S90, it is determined whether or not to interrupt the route search process. If the timeout time is reached, the process is interrupted. In addition, the process is interrupted even when the forced termination operation is performed by the user. If the condition for interrupting the processing is not satisfied, the processing is continued. In S90, if the process continuation condition is satisfied, the process may be continued. Not reaching the timeout time is one of the process continuation conditions. It is also a process continuation condition that the forced termination operation has not been performed. When continuing the process, it returns to S50 and a new waypoint is added. If the process is interrupted, the process proceeds to S100.

S100 is executed by the determination result display processing unit 145. In S100, the determination result is output to the display device 120. The determination result includes under which condition the processing was completed. Therefore, if there is no solution for the inverse kinematics calculation as a result of the determination in S30, a message indicating that there is no solution for the inverse kinematics calculation at the registration waypoints is displayed on the display device 120. When it is determined in S80 that the end point has been reached, the feature that the route reaching the end point has been generated and the waypoint sequence constituting the route from the start point to the end point are displayed.

When it is determined in S90 that the route search process is interrupted and the process proceeds to S100, the display device 120 displays that the route search process has ended due to the interruption. When interference has occurred in the route, the registration waypoint specified by the route in which the interference has occurred, that is, the route determined not to satisfy the condition is also displayed on the display device 120. The registration waypoints to be displayed include the registration waypoint at the rear end of the route determined not to satisfy the condition. In addition, it may include a registration waypoint on the front side of the route determined that the condition is not satisfied. For example, when there are three registration waypoints and registration is performed in the order of registration waypoints 1, 2, and 3, and it is determined that there is the interference in the route between registration waypoints 1 and 2, the registration waypoint 2 or the registration waypoint 2 and the registration waypoint 1 are displayed.

Next, FIG. 5 will be described. In FIGS. 5, S51, S52, S53, and S54 are added to FIG. 4. These S51, S52, S53, and S54 are executed by the route condition determination unit 144. S51 is executed following S50. In S51, it is determined whether or not the formation matches between the determination waypoints. The determination waypoints are the waypoints added in S50 and the existing waypoints connected to the added waypoints. The formation is a posture of the robot 10 that can be taken by another part of the robot 10 when the position and posture of the hand 13 which is the tip of the robot 10 is fixed. There is a combination of the formations that cannot be transformed even though the waypoints added in S50 and the existing waypoints can be realized. Therefore, the determination of S51 is performed. Which combination of formations cannot be transformed is registered in advance. It is said that the formation is consistent when the formation can be transformable.

When the determination result of S51 is "YES", the process proceeds to S52. In S52, a route is generated so that the tip of the hand 13 moves along a line having a predetermined shape from the existing waypoint to the waypoint added in S50. Then, it is determined whether or not there is a singular point in the route. The singular point means a posture in which the robot 10 cannot be controlled in the calculation formula. If it is determined that there is no singular point in the route, the process proceeds to S60. After S60, it is the same as FIG. 4.

If it is determined in S51 that the formation does not match, the process proceeds to S53. Further, when it is determined in S52 that there is a singular point between the waypoints, the process proceeds to S53. S53 is the same as S80, and it is determined whether or not the end point has been reached. If it is determined that the end point has been reached, the process proceeds to S54.

In S54, the error during route generation is updated. The error is registered for each set of registration waypoints. If it is determined that there is a singular point at the time of executing S53, the content of the error is regarded as having a singular point in S54. On the other hand, if the end point is reached without executing S52 even once, the content of the error is regarded as a formation mismatch. After execution in S54, the process shifts to S90. If it is determined in S53 that the end point has not been reached, the process proceeds to S90 without executing S54. This is because if the end point cannot be reached, it is not necessary to consider the formation mismatch and the singularity error.

After executing S54, if it is determined in S90 that the processing is interrupted and the process proceeds to S100, the display device 120 displays the content of the error updated in S54 and the registration waypoint determined by the route in which the error occurs. When it is determined in S90 that the processing is interrupted without executing S54 and the process proceeds to S100, the determination result described in FIG. 4 is output in S100. For example, when an interference has occurred in the route, it is displayed on the display device 120 such as an interference error and a registration waypoint specified by the route in which the interference has occurred.

Note of First Embodiment

In the route generation device 100 of the first embodiment described above, it is determined that the determination result display processing unit 145 controls the display device 120 to display the determination results of the waypoint condition determination unit 142 and the route condition determination unit 144 and the condition determined not to be satisfied (at S100).

In the first embodiment, the waypoint condition determination unit 142 determines the following conditions. That is, the waypoint condition determination unit 142 determines the condition that the registration waypoint has an inverse kinematics solution (at S30) and the condition that the registration waypoint does not interfere with the obstacle (at S40). The route condition determination unit 144 determines the following conditions. That is, the route condition determination unit 144 determines the condition that the route to move toward the added waypoint does not interfere (at S60), the condition that the processing continuation condition is satisfied (at S90), the condition that the formation between the waypoints matches (at S51), and the condition that there is no singular point between the waypoints (at S52).

When the determination result display processing unit 145 controls the display device 120 to display the determination result and the condition determined not to be satisfied when the waypoint condition determination unit 142 and the route condition determination unit 144 determine that the condition is not satisfied. Therefore, the user who uses the route generation device 100 can easily identify the reason why the route cannot be generated by checking the condition displayed on the display device 120 and determined that the condition is not satisfied.

In the case of the CP operation, when the route condition determination unit 144 determines that there is a singular point between the waypoints, even if it has previously determined that the formation between the waypoints does not match, the unit 144 does not output the feature that the formation does not match. Therefore, the feature that the formation does not match is not displayed on the display device 120. By doing so, it is possible to suppress the display that the formation does not match even though the route having the formation matching is allowable.

When the determination result display processing unit 145 displays the condition determined by the waypoint condition determination unit 142 that the condition is not satisfied, the determination result display processing unit 145 also displays the registration waypoint determined that the condition is not satisfied on the display device 120. Further, when the determination result display processing unit 145 displays the condition determined by the route condition determination unit 144 that the condition is not satisfied, the determination result display processing unit 145 also displays the registration waypoint specified by the route determined that the condition is not satisfied on the display device 120. By doing so, the user can more specifically identify the reason why the route cannot be generated.

Second Embodiment

Next, a second embodiment will be described. In the following description of the second embodiment, elements having the same reference numerals as those used so far are the same as the elements having the same reference numerals in the previous embodiment, except when specifically mentioned. When only a part of the configuration is described, the embodiment described above can be applied to other parts of the configuration.

Figure 6:
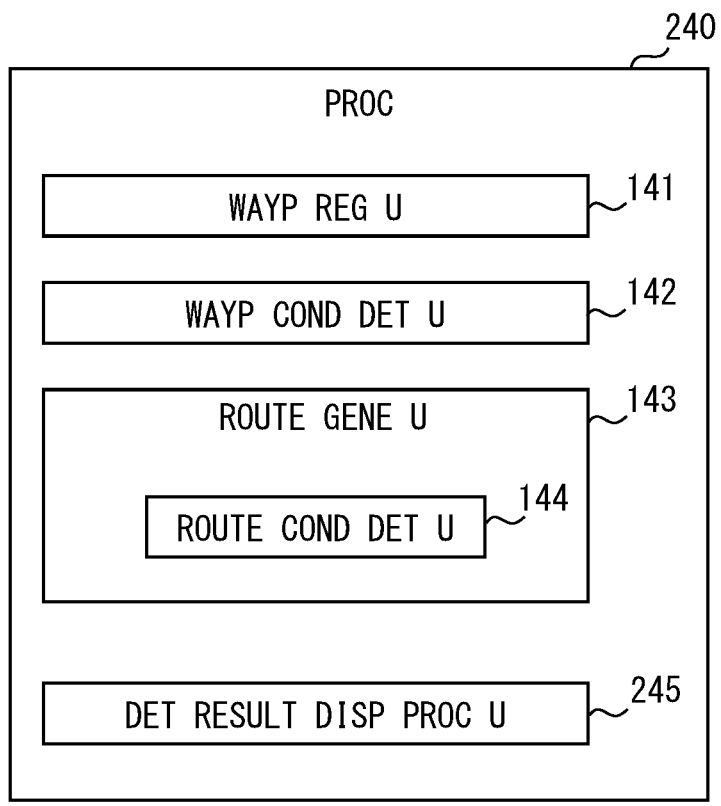
FIG. 6 is a block diagram showing a function executed by a processor according to a second embodiment.

FIG. 6 shows a function executed by the processor 240 included in the route generation device of the second embodiment. In the processor 240 the process executed by the determination result display processing unit 245 is different from the determination result display processing unit 145 of the first embodiment.

Figure 20:
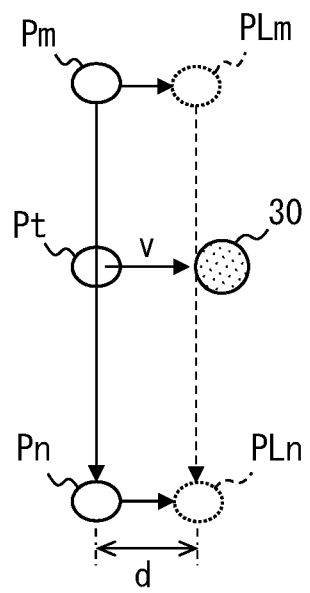
FIG. 20 is a diagram illustrating a movable amount when there is a restriction.

In addition to the content displayed on the display device 120 by the determination result display processing unit 145, the determination result display processing unit 245 displays the waypoint when the route condition determination unit 144 determines that the condition is not satisfied, that is, the posture FIG. 20 indicating the posture of the robot 10 on the display device 120.

It is not necessary to display the posture when it is determined that the condition is not satisfied for all the conditions determined that the condition is not satisfied. It is possible to set in advance the posture of the robot 10 of which condition not satisfied is to be displayed on the display device 120.

Figure 7:
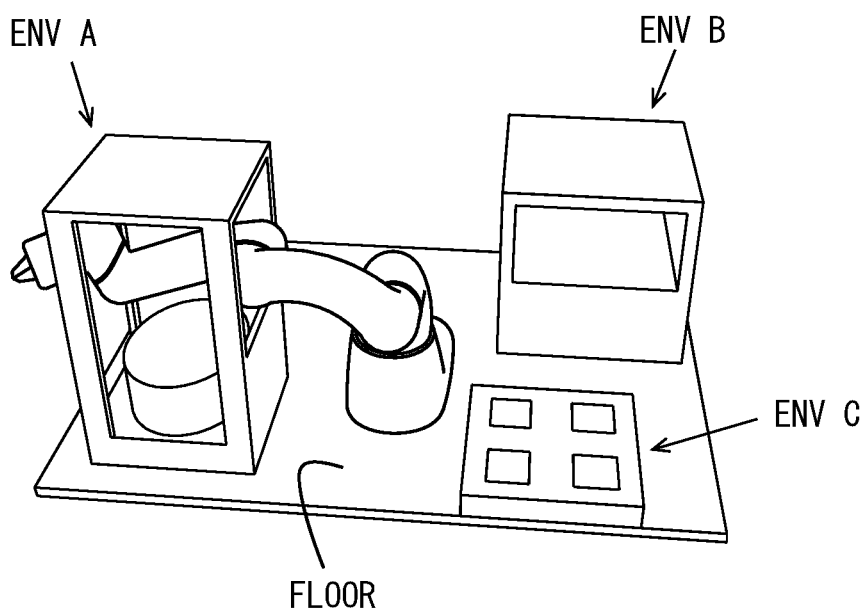
FIG. 7 is a diagram showing an environment in which the route generation device of the second embodiment calculates a route.
Figure 8:
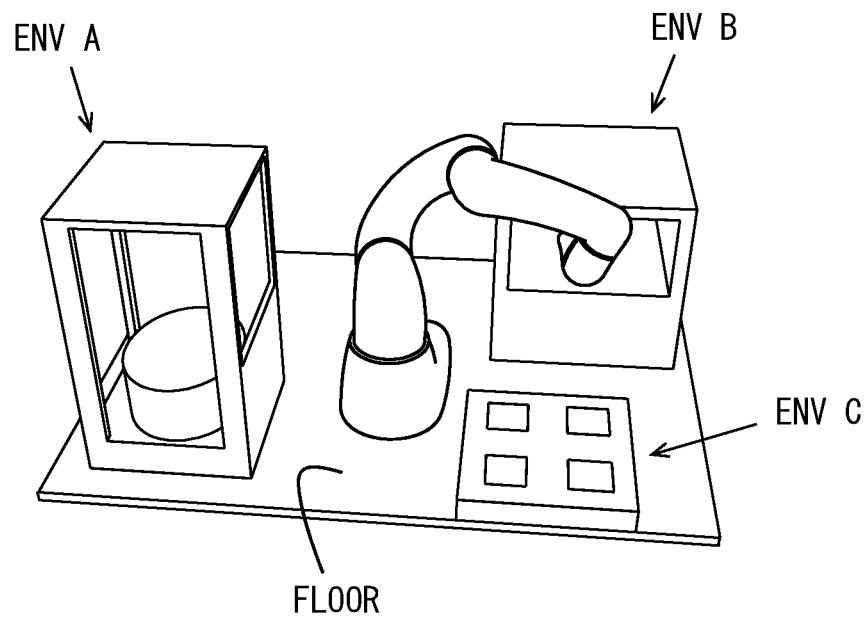
FIG. 8 is a diagram showing an environment in which the route generation device of the second embodiment calculates a route.

A display example displayed by the determination result display processing unit 245 will be described with reference to FIGS. 7 to 10. FIGS. 7 and 8 show an environment in which the route generation device of the second embodiment calculates a route. The robot 10 starts from a posture of grasping an object placed in the environment A and ends at a posture of placing the grasped object in the environment B. The shapes of environment A, environment B, and environment C that are obstacles are registered in the processor 240 in advance.

Figure 9:
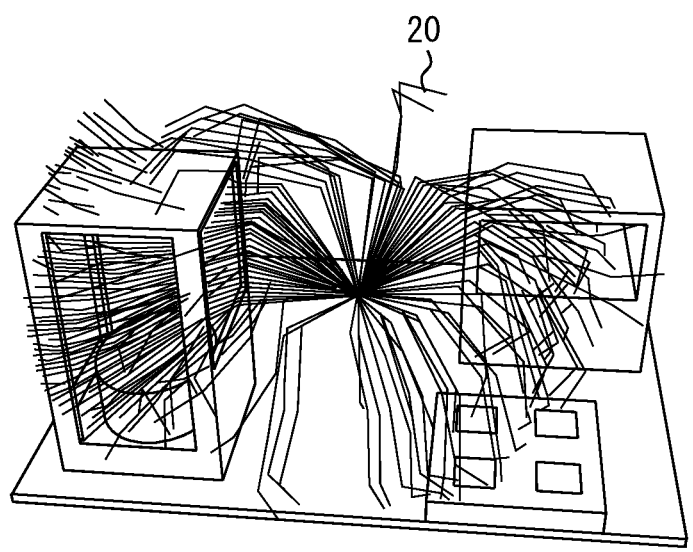
FIG. 9 is a diagram illustrating a posture figure when it is determined that the routes interfere with each other.

FIG. 9 illustrates the posture FIG. 20 when it is determined that the route interferes with the obstacles. The posture FIG. 20 shown in FIG. 9 is a line shape. Here, the posture FIG. 20 may not be limited to the line shape, and may be the shape of the robot 10 as it is or a figure obtained by simplifying the robot 10 by a primitive shape.

Figure 10:
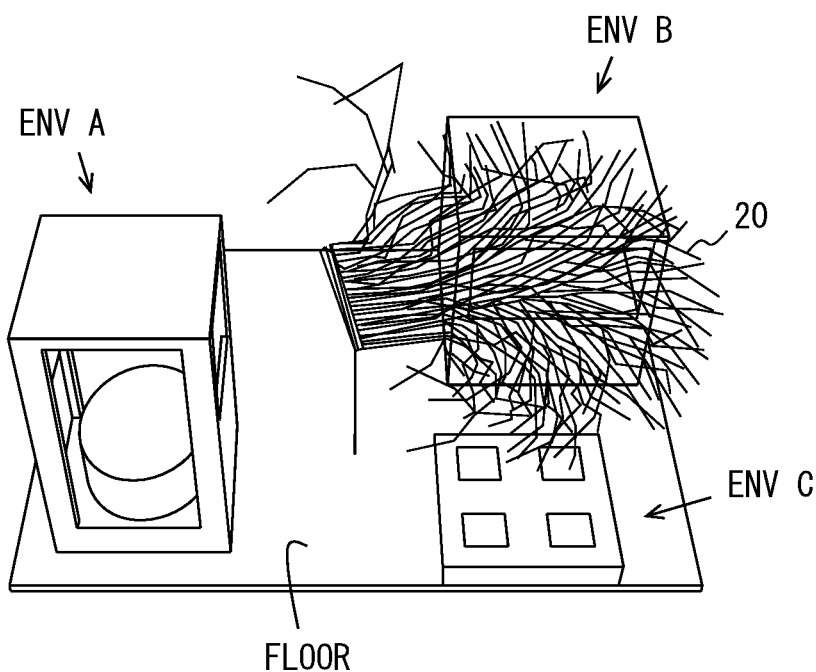
FIG. 10 is a diagram showing a posture figure showing the posture of the robot when it interferes with the environment B.

Further, the determination result display processing unit 245 may display the posture FIG. 20 for each obstacle that is interfering with the robot 10 when the route does not satisfy the condition due to interference with the obstacle. FIG. 10 shows a posture FIG. 20 showing the posture of the robot 10 when it interferes with the environment B.

Figure 11:
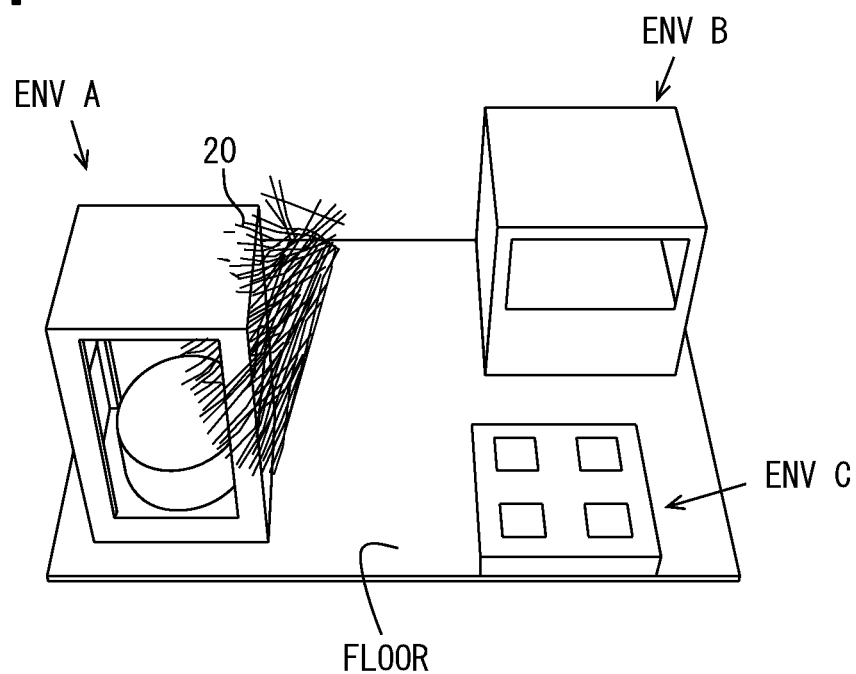
FIG. 11 is a diagram showing the posture of the third arm when it interferes with the environment A as a posture figure.

Further, the determination result display processing unit 245 may display the posture FIG. 20 that is interfering with the obstacle for each portion of the robot 10 that is interfering with the obstacle. FIG. 11 shows the posture of the third arm 12c when it interferes with the environment A as a posture FIG. 20.

Figure 12:
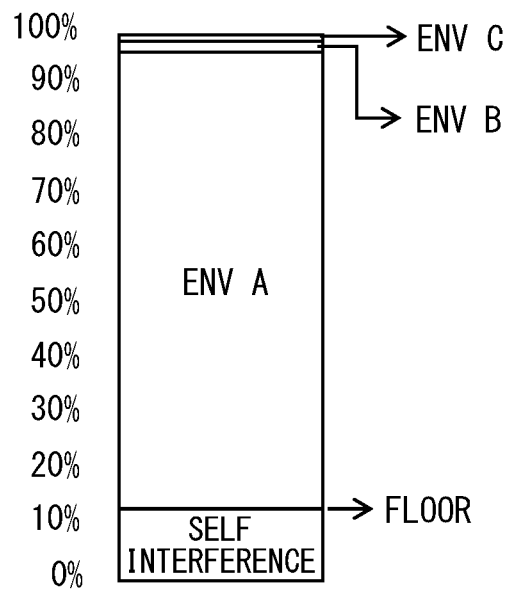
FIG. 12 is a diagram showing a display example of an interference rate.

Further, the determination result display processing unit 245 may display the interference ratio for each interfering object on the display device 120 with respect to the interference generated in the robot 10. The object here includes the robot 10 itself in addition to the obstacle. FIG. 12 shows an example of displaying the interference rate. In the example of FIG. 12, it is shown that the environment A is 80% or more in the ratio of each object that the robot 10 interferes with.

Figure 13:
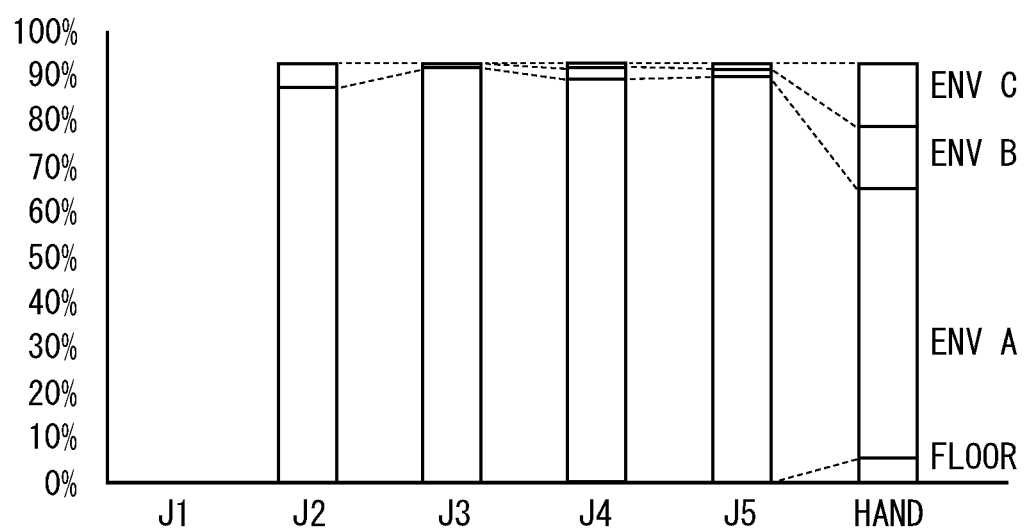
FIG. 13 is a diagram showing the rate of interference for each part that interferes and for each object that interferes.
Figure 14:
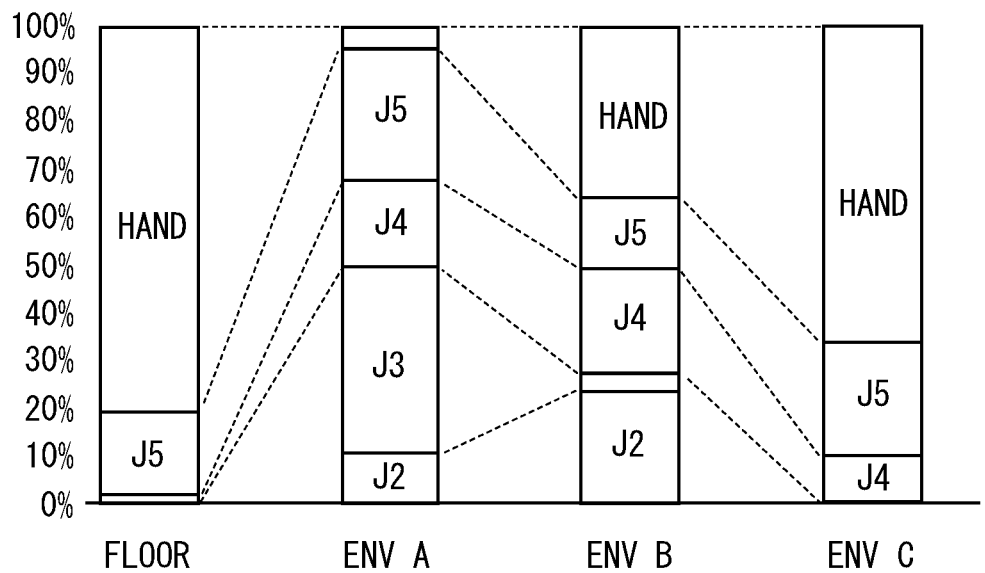
FIG. 14 is a diagram showing the rate of interference for each object that interferes and for each part that interferes.

The determination result display processing unit 245 may display the interference ratio on the display device 120 for each object that interferes and for each part that interferes. FIG. 13 shows an example of the display. In FIG. 13 and FIG. 14 described below, J1 means the first arm 12a, J2 means the second arm 12b, J3 means the third arm 12c, J4 means the fourth arm 12d, and J5 means the fifth arm 12e. As shown in FIG. 13, it can be seen that every part has a high rate of interference with the environment A. When checking this, the user can see that changing the shape and position of the environment A seems to be effective for finding a route.

FIG. 14 is another example of displaying the ratio of interference for each object that interferes and for each part that interferes. FIG. 13 shows the proportion of the object that each part interferes with. On the other hand, FIG. 14 shows the ratio of the parts where each object interferes. As shown in FIG. 14, the rate of the environment A is about 50% due to the interference between J2 and J3, that is, the second arm 12b and the third arm 12c. When checking this, the user can see that the interference ratio of the basic part of the robot 10 is large. If there is interference in the basic part, the joint on the tip side from the basic part will interfere at any angle, so the closer the interfering part is to the basic part, the smaller the non-interfering operation range. Therefore, in order to find a route, it is necessary to consider increasing the opening of the environment A. The user can select which of the figures illustrated in FIGS. 9 to 14 is to be displayed on the display device 120.

Note of Second Embodiment

In the second embodiment, the determination result display processing unit 245 displays the posture FIG. 20 showing the posture of the robot 10 when the route condition determination unit 144 determines that the condition is not satisfied, and the interference rate on the display device 120. This makes it easier to identify the reason why the route cannot be generated.

Third Embodiment

Figure 15:
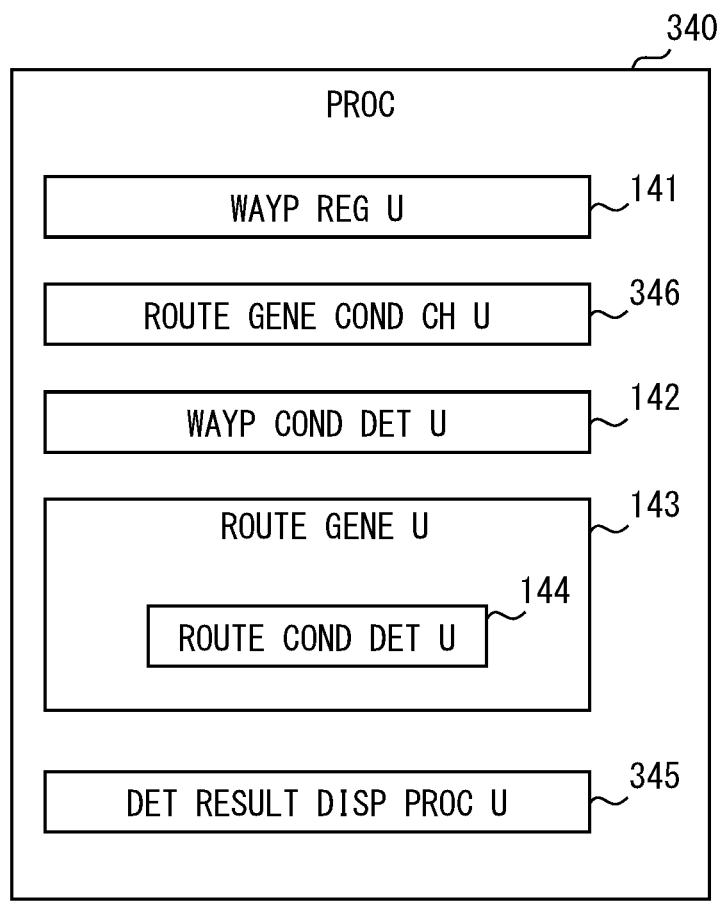
FIG. 15 is a block diagram showing a function executed by a processor according to a third embodiment.

FIG. 15 shows a function executed by the processor 340 included in the route generation device of the third embodiment. The processor 340 is different from the processors 140 and 240 in that the route generation condition changing unit 346 is provided, and the processing executed by the determination result display processing unit 345 is different from the determination result display processing units 145 and 245.

The route generation condition changing unit 346 changes the state setting value indicating the state affecting the route within the range set by the user. The state setting value is a value indicating the state of the robot 10 or the state of an obstacle. The state setting value indicating the state of the robot 10 refers to a value changeable when examining the route of the robot 10 in addition to the route. The state setting value indicating the state of the robot 10 includes the arrangement of the robot 10. Further, the state setting value indicating the state of the robot 10 can include the feature whether or not the hand 13 grips the work and the shape of the work. The state setting value indicating the state of the obstacle includes the arrangement of the obstacle. Further, the state setting value indicating the state of the obstacle can include the shape of the obstacle when the shape of the obstacle can be changeable such that the door can be opened and closed.

The route generation condition changing unit 346 changes the state setting value at a predetermined change interval within the range set by the user. The change interval may be set in advance or may be set by the user each time. The route generation unit 143 generates a route each time the route generation condition changing unit 346 changes the state setting value. When the route generation unit 143 generates a route, the route condition determination unit 144 determines whether the route satisfies the condition that the robot 10 can be operated. Therefore, the route condition determination unit 144 also determines each time the route generation condition change unit 346 changes the state setting value.

FIG. 16 shows a determination result for each waypoint when the arrangement of the robot 10 is changed. The registration waypoint 0 means the starting point. The arrangement of the robot 10 is an example of the state setting value. In FIG. 16, "Enable" means successful route generation, that is, operational, "IK Failed" means that there is no inverse kinematics solution, and "IK Success" means that there is an inverse kinematics solution, and there is no interference, and "Collision Point" means that there is interference.

Figure 17:
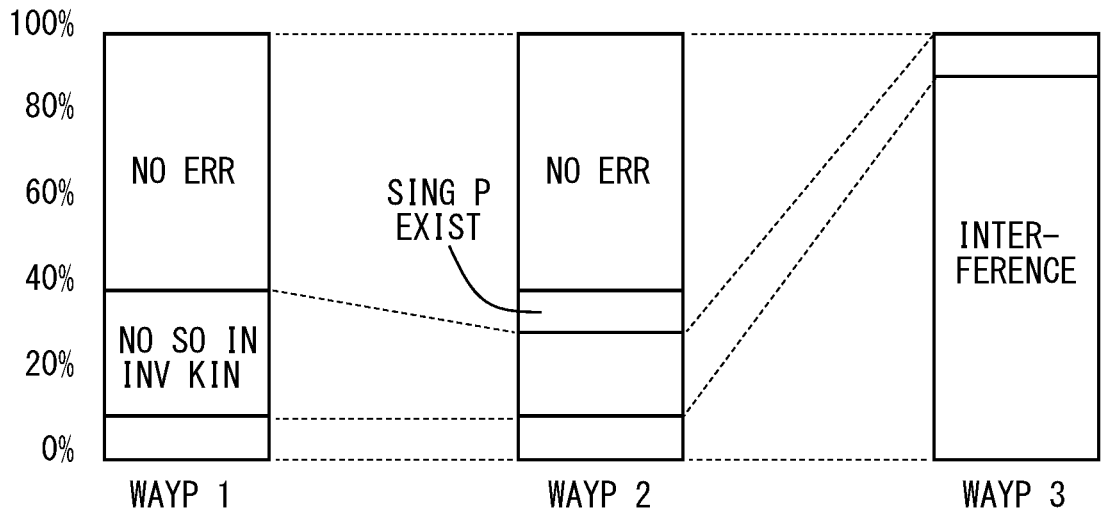
FIG. 17 is a diagram showing a display example in which determination results when the state setting value is changed are aggregated.

The determination result display processing unit 345 displays the aggregation result of the determination results when the state setting value is changed on the display device 120. FIG. 17 shows an example of displaying the aggregation result. The display example shown in FIG. 17 shows the ratio of each type of determination result for the three registration waypoints. When "no error" is displayed in FIG. 17, it means that the operation is possible. The waypoint 3, which means the third registration waypoint, has almost no ratio indicating no error. Therefore, it can be seen that the user who checks the display example of FIG. 17 needs to review the third registration waypoint.

Fourth Embodiment

Figure 18:
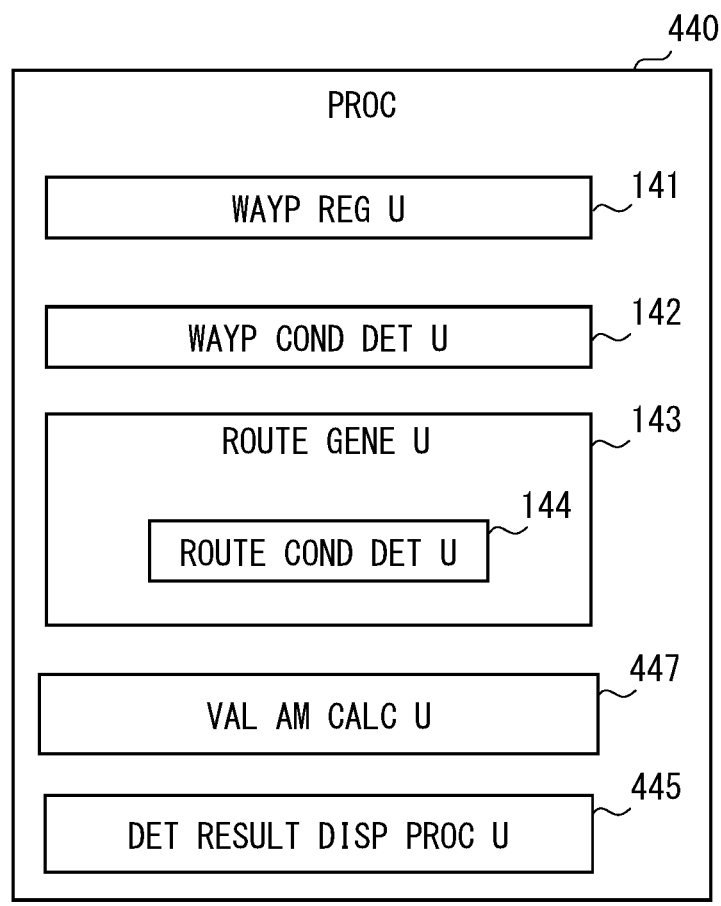
FIG. 18 is a block diagram showing a function executed by a processor according to a fourth embodiment.

FIG. 18 shows a function executed by the processor 440 included in the route generation device of the fourth embodiment. The processor 440 is different from the processors 140, 240 and 340 in that the variable amount calculation unit 447 is provided, and the processing executed by the determination result display processing unit 445 is different from the determination result display processing units 145, 245 and 345.

The variable amount calculation unit 447 calculates the variable amount at which the tip position of the robot 10 can move while satisfying the condition for the route determined by both the waypoint condition determination unit 142 and the route condition determination unit 144 to satisfy the condition.

Figure 19:
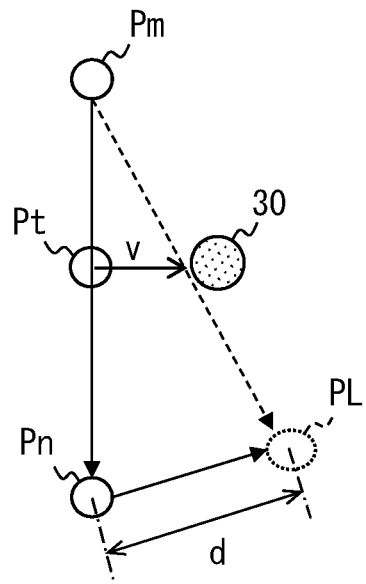
FIG. 19 is a diagram illustrating a movable amount when there is no restriction.

The variable amount will be described with reference to FIGS. 19 and 20. FIG. 19 shows the movable amount d when there is no restriction. The movable amount d means the maximum amount of movement that the waypoint Pn can move while satisfying the condition in the joint space indicating the posture depending on the joint angle. The variable amount is the amount of movement of the tip of the hand 13 obtained from the movable amount d. In FIG. 19, the waypoint is indicated by P. It is assumed that the route to move from the waypoint Pm to the waypoint Pn is calculated. Note that n and m are natural numbers indicating the numbers of the waypoints P. In FIG. 19, the limit waypoint PL is a point where the waypoint Pn as a target for calculating the movable amount d is displaced in the direction of error by the movable amount d.

FIG. 20 shows the movable amount d when there is restriction. The restriction is defined for the movement of a part or all of the parts of the robot 10. An example of the restriction is a constraint on the position and posture of the tip of the hand 13. More specifically, an example of the restriction is that the tip of the hand 13 needs to move up and down in the vertical direction in a posture in which the work can be grasped. The restriction is entered by the user. Due to the restriction, it may be necessary to move the waypoint Pm connected to the waypoint Pn together with the waypoint Pn as the target for calculating the movable amount d. In FIG. 20, there are two limit waypoints PLm and PLn. These two limit waypoints PLm and PLn are limit waypoints corresponding to the waypoints Pm and Pn, respectively.

Figure 21:
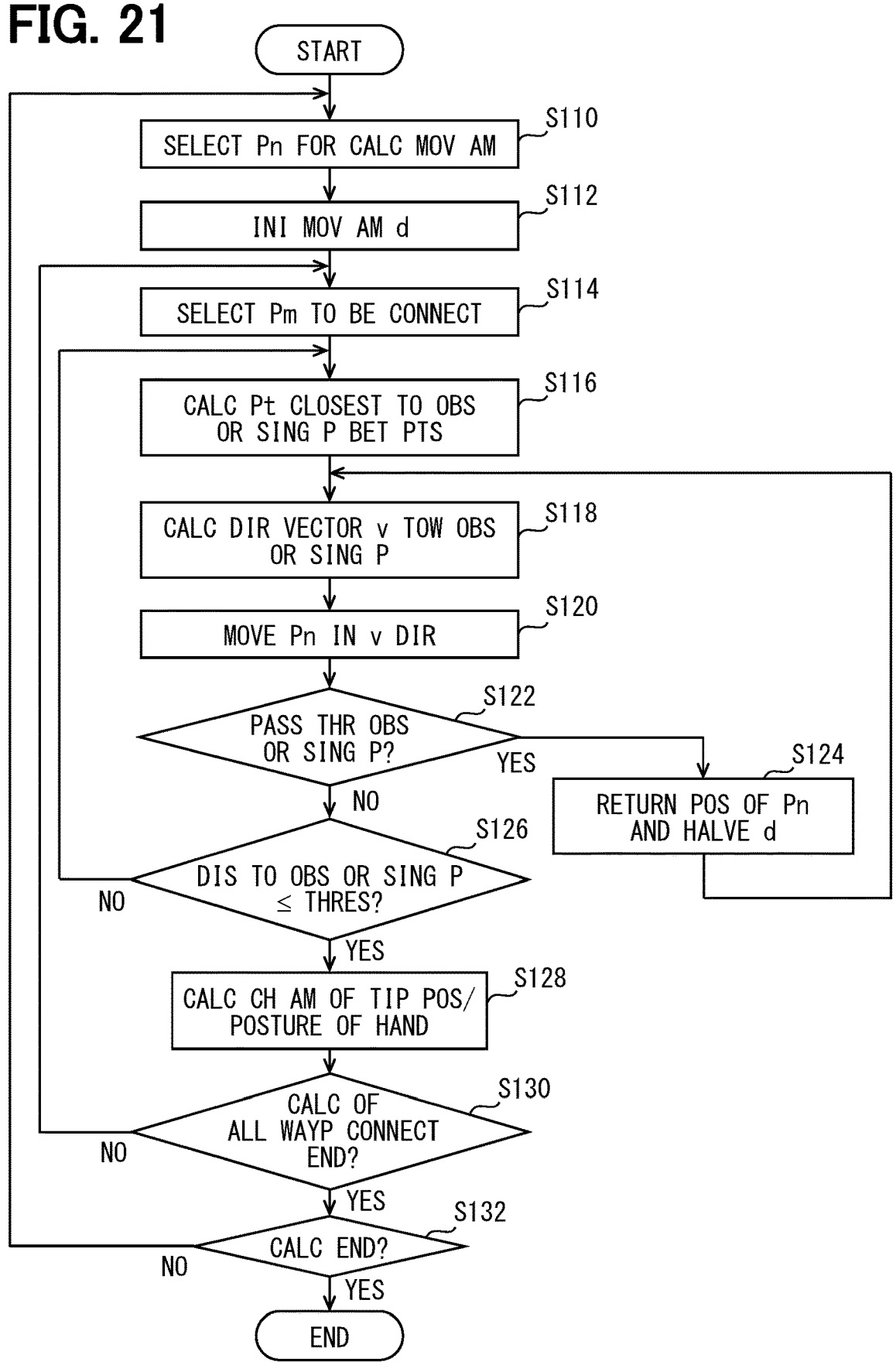
FIG. 21 is a diagram showing a process executed by the variable amount calculation unit.

FIG. 21 shows a process executed by the variable amount calculation unit 447. In S110, the waypoint Pn for calculating the movable amount d is selected. The waypoint Pn that need to be selected in this S110 is, for example, any one of all the waypoints included in the route from the start point to the end point. When it is necessary to select a plurality of waypoints Pn, the waypoints Pn are selected one by one in order. The user may specify the waypoint Pn to be selected here. When specified by the user, a part or all of the registration waypoints will be specified.

In S112, the movable amount d is initialized to be a preset initial value. In S114, the waypoint Pm connected to the waypoint Pn selected in S110 is selected in the route determined to be reachable from the start point to the end point. In S116, the waypoint Pt indicating the posture closest to the obstacle or the singular point is calculated between the waypoints Pn and Pm selected in S110 and S114. In S118, the direction vector v toward the obstacle or the singular point is calculated from the waypoint Pt calculated in S116.

FIG. 19 shows this direction vector v. Here, FIG. 19 is an explanatory diagram showing the direction vector v on a two-dimensional plane. The direction vector v is actually a direction vector toward an obstacle or a singular point in 6-axis space. Similar to FIG. 19, FIG. 20 is an explanatory diagram.

In S120, in the case of PTP operation, the waypoint Pn is moved by the movable amount d in the direction of the direction vector v calculated in S118. In the case of CP operation, the position of the waypoint Pn after movement is determined by the following equations 1 and 2. The function f is a function for obtaining the tip position and posture of the hand 13 from the joint angle by forward kinematics. Equation 1 is an equation showing the amount of movement of the tip of the hand 13 in the three-dimensional space when the waypoint Pt moves by dv in the joint space. Equation 2 is an equation for calculating the position of the waypoint Pn in the joint space when the tip of the hand 13 moves by δt in the three-dimensional space. If there is the restriction, the waypoint Pm also moves by the same amount.

$$\delta t = f(Pt) - f(Pt + dv) \quad \text{(Equation 1)}$$

$$Pn \leftarrow f^{-1}(f(Pn) + \delta t) \quad \text{(Equation 2)}$$

In S122, it is determined whether or not the waypoint Pn after movement has passed through an obstacle or a singular point. When the determination result of S122 is "YES", the process proceeds to S124. In S124, the waypoint Pn is returned to the position of the previous step, and the movable amount d is halved. Thereafter, the process returns to S118.

If the determination result of S124 is NO, the process proceeds to S126. In S126, it is determined whether or not the distance between the waypoint Pn and the obstacle or the singular point is equal to or less than a preset threshold value. If the determination result of S126 is NO, the process returns to S116. By repeating S116 to S126, the movable amount d shown in FIGS. 19 and 20 can be determined. When the determination result of S126 is "YES", the process proceeds to S128.

In S128, the amount of change in the tip position and posture of the hand 13 before and after the movement of the waypoint Pn is calculated. In the following S130, it is determined whether or not the calculation is completed for all the waypoints Pm connected to the waypoint Pn selected in 5110 at this moment.

If the determination result of S130 is NO, the process returns to S116. When the determination result of S130 is "YES", the process proceeds to S132.

In S132, it is determined whether or not to end the calculation. This determination is to determine whether or not all the waypoints Pn have been selected. If the determination result of S132 is NO, the process returns to 5110, the next waypoint Pn is selected, and 5110 and successive steps are executed. If the determination result of S132 is YES, the process of FIG. 21 is terminated. The minimum value of the amount of change calculated in S128 repeatedly executed until the processing of FIG. 21 is completed is defined as the variable amount.

The determination result display processing unit 445 also displays the variable amount calculated by the variable amount calculation unit 447 on the display device 120. When the robot 10 is installed in the actual environment, it is considered that there may be a slight error between the actual position of the robot 10 and the installation position of the robot 10 at the time of calculation. Further, it is considered that the operation of the robot 10 in the actual environment may have a slight error with respect to the calculation time. The user who operates the route generation device can determine whether or not the robot 10 can operate reliably in the actual environment in consideration of these errors and the variable amount displayed on the display device 120.

Although the embodiments have been described above, the disclosed technology is not limited to the above-described embodiment, and the following modifications are included in the present disclosure, and various modifications can be made without departing from the spirit of the present disclosure.

First Modification

In addition to the content to be displayed in the above-described embodiment, the determination result display processing unit may also display the distance between the registration waypoint and the obstacle on the display device 120.

Second Modification

When displaying the posture FIG. 20, the color of the interfering part may be displayed in a color different from that of other parts.

Third Modification

When displaying the posture FIG. 20 for each obstacle that interferes with the robot 10, one obstacle may be divided into a plurality of pieces. As a method of dividing one obstacle into a plurality of pieces, a method of automatically clustering such as a k-means method or a mean shift method can be used.

Fourth Modification

When the variable amount is equal to or less than the threshold value, the route condition determination unit may determine that the robot 10 is inoperable.

Fifth Modification

The control device 130 and the method described in the present disclosure may be implemented by a special purpose computer including a processor programmed to perform one or more functions embodied by a computer program. Alternatively, the control device 130 and the method described in the present disclosure may be implemented by a dedicated hardware logic circuit. Alternatively, the control device 130 and the method described in the present disclosure may be implemented by one or more dedicated computers configured by a combination of a processor executing a computer program and one or more hardware logic circuits. The hardware logic circuits may be, for example, ASIC or FPGA.

The storage medium for storing the computer program is not limited to ROM. Alternatively, the computer program may be stored in a computer-readable, non-transitory tangible storage medium as instructions to be executed by a computer. For example, the program may be stored in a flash memory.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

Here, the process of the flowchart or the flowchart described in this application includes a plurality of sections (or steps), and each section is expressed as, for example, S10. Further, each section may be divided into several subsections, while several sections may be combined into one section. Furthermore, each section thus configured may be referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A route generation device that generates a route for moving a robot with multiple parts that are connected and configured to rotate, the route generation device comprising:
   a waypoint registration unit that is configured to register a plurality of waypoints including a start point and an end point, each of which indicates one posture of the robot;
   a waypoint condition determination unit that is configured to determine whether a registration waypoint, which is the waypoint registered by the waypoint registration unit, is allowable as the posture of the robot, based on a predetermined condition;
   a route generation unit that is configured to generate the route connecting an added waypoint and an existing waypoint while adding the waypoint; and
   a route condition determination unit that is configured to determine whether the route generated by the route generation unit satisfies a condition for enabling the robot to operate, wherein:
   the route generation unit and the route condition determination unit repeat processing until the route reaches the end point when a process continuation condition is satisfied,
   the route generation device further comprising:
   a determination result display processing unit that is configured to display determination results determined by the waypoint condition determination unit and the route condition determination unit and a condition determined not to be satisfied in determination processes on a display device,
   wherein
   the determination result display processing unit displays on the display device a rate of interference, the rate of interference comprising a respective percentage of each object that interferes with the robot as the interference occurring in the robot, which is one of states in which the route does not satisfy the condition.

2. The route generation device according to claim 1, wherein:
   the condition determined by the waypoint condition determination unit includes a condition that a solution of an inverse kinematics calculation exists and a condition that no interference with an obstacle exists.

3. The route generation device according to claim 1, wherein:
   the condition determined by the route condition determination unit includes a condition that the route does not interfere with an obstacle.

4. The route generation device according to claim 3, wherein:
   when the route generation unit generates the route in which a position of a tip of the robot moves linearly in a work space between the start point and the end point, the condition determined by the route condition determination unit includes: a condition that a formation of the robot capable of having when the position and a posture of the tip of the robot is fixed matches in a set of determination waypoints defined as the added waypoint by the route generation unit and one of the waypoints connected to the added waypoint; and a condition that no singular point exists between the determination waypoints.

5. The route generation device according to claim 4, wherein:
   the route condition determination unit determines whether the formation in the set of determination waypoints matches;
   when determining that the formation matches, the route condition determination unit determines whether the singular point exists between the determination waypoints; and
   when determining that the singular point exists in the route which has reached the end point, the route condition determination unit does not output a determination result that the formation does not match.

6. The route generation device according to claim 1, wherein:
   the determination result display processing unit displays the registration waypoint determined not to satisfy the condition on the display device when displaying the condition determined not to be satisfied by the waypoint condition determination unit.

7. The route generation device according to claim 1, wherein:
   the determination result display processing unit displays the registration waypoint specified in the route determined not to satisfy the condition on the display device when displaying the condition determined not to be satisfied by the waypoint condition determination unit.

8. The route generation device according to claim 1, wherein:
   the determination result display processing unit displays a posture figure, indicating a posture of the robot when the route condition determination unit determines that the condition is not satisfied, on the display device.

9. The route generation device according to claim 8, wherein:
   the determination result display processing unit displays the posture figure for each obstacle that interferes with the robot when the route does not satisfy the condition due to interference with an obstacle.

10. The route generation device according to claim 9, wherein:
the determination result display processing unit displays the posture figure that interferes with the obstacle for each part of the robot that interferes with the obstacle.

11. The route generation device according to claim 1, wherein:
the determination result display processing unit displays on the display device the rate of interference for each object that interferes with the robot and for each part of the robot that interferes with the object.

12. The route generation device according to claim 1, further comprising:
a route generation condition changing unit that is configured to change a state setting value indicating a state that affects the route, which is at least one of a state of the robot and a state of an obstacle, within a range set by an user, wherein:
the route generation unit generates the route each time the route generation condition changing unit changes the state setting value; and
the determination result display processing unit displays, on the display device, an aggregation result of an aggregation of determination results when the state setting value is changed.

13. The route generation device according to claim 1, further comprising:
a variable amount calculation unit that is configured to calculate a variable amount that allows a position of a tip of the robot to be movable while satisfying the condition with respect to the route that is determined by both the waypoint condition determination unit and the route condition determination unit to satisfy the condition, wherein:
the determination result display processing unit further displays the variable amount on the display device.

14. The route generation device according to claim 1, further comprising:
one or more processors; and
a memory coupled to the one or more processors and storing program instructions that when executed by the one or more processors cause the one or more processors to provide at least: the waypoint registration unit; the waypoint condition determination unit; the route generation unit; the route condition determination unit; and the determination result display processing unit.

15. A route generation method for generating a route for a robot with multiple parts that are connected and configured to rotate, the route generation method comprising:
registering a plurality of waypoints, each of which indicates one posture of the robot, and including a start point and an end point;
determining whether a registration waypoint, which is registered as the waypoint, is allowable as the posture of the robot based on a predetermined condition;
generating the route connecting an added waypoint and an existing waypoint while adding the waypoint;
determining whether a generated route satisfies the condition that the robot is operable;
repeating the adding of the waypoint and generating of the route until the route reaches the end point when a process continuation condition is satisfied; and
displaying a determination result of the registration waypoint, a determination result of the generated route, and the condition determined not to be satisfied in a determination process on a display device,
wherein
the determination result display processing unit displays on the display device a rate of interference, the rate of interference comprising a respective percentage of each object that interferes with the robot as the interference occurring in the robot, which is one of states in which the route does not satisfy the condition.

16. A non-transitory computer readable storage medium comprising instructions being executed by a computer, the instructions including a computer- implemented method for generating a route for a robot with multiple parts that are connected and configured to rotate, the instructions including:
registering a plurality of waypoints, each of which indicates one posture of the robot, and including a start point and an end point;
determining whether a registration waypoint, which is registered as the waypoint, is allowable as the posture of the robot based on a predetermined condition;
generating the route connecting an added waypoint and an existing waypoint while adding the waypoint;
determining whether a generated route satisfies the condition that the robot is operable; repeating the adding of the waypoint and generating of the route until the route reaches the end point when a process continuation condition is satisfied; and
displaying a determination result of the registration waypoint, a determination result of the generated route, and the condition determined not to be satisfied in a determination process on a display device,
wherein
the determination result display processing unit displays on the display device a rate of interference, the rate of interference comprising a respective percentage of each object that interferes with the robot as the interference occurring in the robot, which is one of states in which the route does not satisfy the condition.

* * * * *